Feb. 12, 1952     E. L. SMITH     2,585,180
TRAY COVER
Filed Jan. 28, 1947
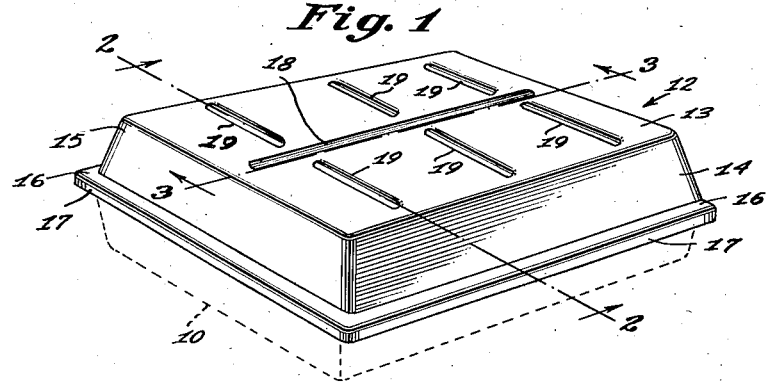
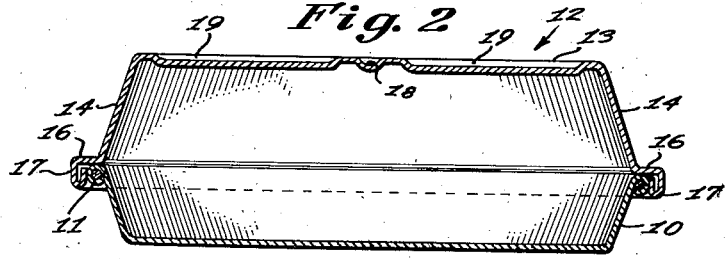
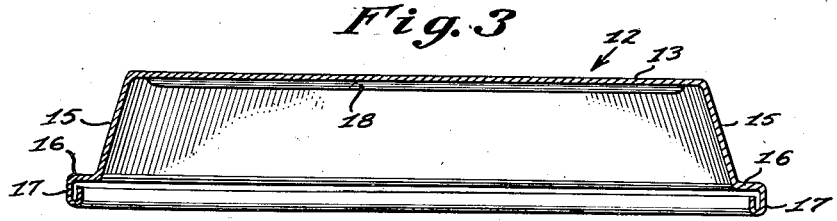
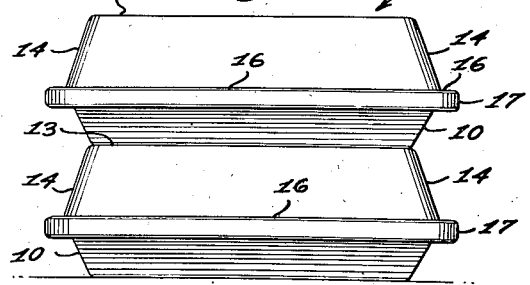
Inventor
ETHMER L. SMITH Patented Feb. 12, 1952

2,585,180

UNITED STATES PATENT OFFICE 2,585,180

TRAY COVER

Ethmer L. Smith, Rock Island, Ill.

Application January 28, 1947, Serial No. 724,862

1 Claim. (Cl. 220—42)

My invention relates to bakery utensils and more particularly to covers for conventional baking trays, bun trays, display trays, or pans which are standard as to size and depth and are commercially available.

The object of my invention is to provide a cover for conventional baking trays or pans and the like adapted to be used to cover bakery goods while they are being delivered from bakery to store or to home, keeping the bakery goods free from dirt, flies and the like.

Another object of my invention is to provide a cover for baking trays or pans adapted to support another covered tray thereon, so that such trays can be stacked for the purpose of saving space in storage or delivery.

A further object of my invention is to provide covers for baking trays or the like adapted to be nested into each other, when not in use.

Other objects of my invention may appear in the following specification describing my invention with reference to the accompanying drawing illustrating a preferred embodiment of my invention.

It is, however, to be understood that my invention is not to be limited or restricted to the exact construction and combination of parts described in the specification and shown in the drawing, but that such changes and modifications can be made, which fall within the scope of the claim appended hereto.

In the drawing—

Figure 1 is a perspective view of a tray or pan cover according to my invention applied to a baking tray or pan shown in broken lines.

Figure 2 is a vertical longitudinal sectional view taken on line 2—2 of Figure 1.

Figure 3 is an enlarged transverse vertical sectional view taken on line 3—3 in Figure 1, and Figure 4 is an end view of two baking pans provided with covers according to my invention and stacked on top of each other.

Referring now in detail to the drawings, the shallow standard or conventional baking pan 10 illustrated has an external bead 11 formed on the upper edges of its upwardly and outwardly angulated sidewalls. The illustrated cover 12 is preferably made from galvanized sheet metal, but can be made as a stamping from any bright non-tarnishing metal, such as aluminum, stainless steel or the like of any desired weight and gauge.

The cover 12 is composed of a top 13 of rectangular shape having integral depending sidewalls 14 and endwalls 15 which flare outwardly and downwardly from the edges of the top 13. Each of the cover walls 14 and 15 has on its lower edge a horizontally and laterally outwardly extending flange 16 terminating in a downwardly directed flange 17 terminating in a laterally inwardly and upwardly return resilient bent lip 17' having a plane free end portion 18'. The cover walls 14 and 15 are so formed that the horizontal flanges 16 rest upon the top of the pan beads 11 with the plane free end portions 18' of the lip 17' engaged with the outer sides of the beads 11 of the pan 10 when the cover 12 is in operative position on the pan, whereby the top of the pan 10 is closed tightly and any bakery goods located in said pan are protected against contamination by dirt, dust, flies and the like and in addition are prevented from drying too fast, so that they will remain fresh longer.

In order to strengthen the top 13 of the cover 12 to enable it to support one or more loaded and covered baking pans 10 stacked thereupon, a longitudinal centrally located and downwardly projecting rib 18, and a plurality of transverse downwardly projecting ribs 19 are formed on said top 13.

These ribs can be formed by stamping or the like.

When the covers 13 are not in use, they can be nested into each other, whereby storing or shipping space is saved.

Having described my invention, I claim as new and desire to secure by Letters Patent:

In combination, a baking pan having upwardly and laterally outwardly flaring walls terminating in a laterally outwardly directed bead, and a removable cover comprising a flat top formed on its edges with depending laterally outwardly flaring sidewalls terminating at their lower edges in laterally outwardly directed horizontal flanges resting upon the top of the pan bead, said horizontal flange being formed on its laterally outward edge with a depending vertical flange terminating at its lower edge in a laterally inwardly and upwardly directed resilient return bend in spaced relation to said vertical flange and having a cylindrical free edge portion engaging the outer side of the pan bead.

ETHMER L. SMITH.

REFERENCES CITED

The following references are of record in the file of this patent:

UNITED STATES PATENTS

| Number | Name | Date |
| --- | --- | --- |
| 656,032 | Meredith | Aug. 14, 1900 |
| 663,921 | McMullen | Dec. 18, 1900 |
| 1,189,860 | Nevelson | July 4, 1916 |
| 1,393,815 | Nowack | Oct. 18, 1921 |
| 1,627,541 | Katzinger | May 3, 1927 |
| 1,628,885 | Jackson | May 17, 1927 |
| 1,637,144 | Fritzges | July 26, 1927 |
| 2,019,376 | Wilhelm | Oct. 29, 1935 |
| 2,134,997 | Blondi | Nov. 1, 1938 |

FOREIGN PATENTS

| Number | Country | Date |
| --- | --- | --- |
| 628,144 | France | June 21, 1927 |